United States Patent [19]

Kaiga et al.

[11] Patent Number: 5,034,198

[45] Date of Patent: Jul. 23, 1991

[54] OZONE GENERATOR AND OZONE GENERATING METHOD

[75] Inventors: Nobuyoshi Kaiga, Nakano; Osamu Takase, Hachioji, both of Japan

[73] Assignee: Kabushiki Kaisha Toshiba, Kawasaki, Japan

[21] Appl. No.: 461,002

[22] Filed: Jan. 4, 1990

[30] Foreign Application Priority Data

Jan. 9, 1989 [JP] Japan .................................... 1-1310

[51] Int. Cl.$^5$ .............................................. C01B 13/11

[52] U.S. Cl. .......................... 422/186.07; 422/186.18; 204/176

[58] Field of Search ...................... 422/186.07, 186.18; 204/164, 176

[56] References Cited

U.S. PATENT DOCUMENTS

| | | | |
|---|---|---|---|
| 4,504,446 | 3/1985 | Kunicki et al. | 422/186.19 |
| 4,774,062 | 9/1988 | Heinemann | 422/186.19 |
| 4,859,429 | 8/1989 | Nisenson | 422/186.19 |

FOREIGN PATENT DOCUMENTS

| | | |
|---|---|---|
| 55-38030 | 10/1980 | Japan . |
| 57-47124 | 10/1982 | Japan . |

OTHER PUBLICATIONS

Toshiba Review, vol. 33, No. 1, p. 32 (1978) H. Yasui et al.

*Primary Examiner*—Deborah L. Kyle
*Assistant Examiner*—J. Woodrow Eldred
*Attorney, Agent, or Firm*—Oblon, Spivak, McClelland, Maier & Neustadt

[57] ABSTRACT

An ozone generator includes a feed gas chamber for receiving a feed gas, an ozone gas chamber for receiving a produced ozone gas, a tubular electrode for connecting the two chambers, a discharge tube inserted in the tubular electrode, and a power source unit for applying a voltage having a frequency higher than a frequency of commercial power between a metal film and the tubular electrode to generate a discharge having a frequency higher than the frequency of commercial power. The discharge tube is constituted by a glass tube and the metal film coated on the inner surface of the glass tube. The metal film is made of stainless steel in order to improve an ozone resistance and a nitric acid resistance and is formed to have a thickness of 2,0000 Å to 5,000 Å in order to prevent generation of sparks and to enhance a thermal shock resistance.

30 Claims, 3 Drawing Sheets

OZONE GENERATOR AND OZONE GENERATING METHOD

BACKGROUND OF THE INVENTION

1. Field of the Invention

The present invention relates to improvements in an ozone generator and an ozone generating method and, more particularly, to improvements in an apparatus and a method of generating ozone by using silent discharge by application of a high-frequency electric field.

2. Description of the Related Art

In recent years, ozone is widely used in order to purify service water or highly treat sewage and liquid waste. In order to satisfy requests in these fields, a large capacity ozone generator capable of stably generating ozone is desired.

A conventional ozone generator generally comprises a discharge tube (dielectric high voltage electrode) constituted by a tube made of, e.g., glass and an aluminum film or the like formed on this tube. By performing discharge between the discharge tube and a ground electrode, oxygen in a feed gas is activated to produce ozone.

Upon production of ozone $O_3$, a small amount of nitrogen oxide $NO_x$ is also produced. This nitrogen oxide reacts with moisture in the gas to produce nitric acid. This nitric acid corrodes the discharge tube, the ground electrode, and the like. In order to prevent the production of nitric acid, pure oxygen may be used as a feed gas. In this method, however, pure oxygen must be prepared. In addition, the moisture in the feed gas may be removed to supply a dry feed gas to an ozone generator. In this method, however, a dryer must be prepared independently of the ozone generator. And it is impossible to revome the noisture from the feed gas, and $NO_x$ is produced, though in very small quantities. $NO_x$ thus produced sticks onto the tubes. When the ozone generator is overhauled for inspection or repair, air flows thereinto, and $NO_x$ reacts with the moisture in the air, inevitably producing nitrogen acid.

In order to solve the above problems, a technique of forming the discharge tube, the ground electrode, and the like of the ozone generator by a material such as stainless steel having an ozone resistance and a nitric acid resistance is proposed in Published Examined Japanese Patent Application No. 57-47124. Stainless steel has good ozone and nitric acid resistances. For this reason, according to the technique described in this Published Examined Japanese Patent Application, the ozone generator can stably operate for a long time period even if nitric acid is produced together with ozone.

In order to improve an ozone production amount per unit volume of the ozone generator, a method of increasing the frequency of the power supplied to the discharge tube up to a high frequency from about 500 Hz to about 2,000 Hz (higher than a frequency of commercial power (generally 50 or 60 Hz)) is known. When the frequency of the power is increased to a high frequency, discharge electric power is increased to increase an ozone generation amount per unit volume of the ozone generator.

In an ozone generator including a discharge tube having a stainless steel film, however, if the generator is operated by setting a high frequency as a frequency of the power, a conductive film formed on a glass tube is sometimes peeled therefrom.

SUMMARY OF THE INVENTION

The present invention has been made in consideration of the above situation and has as its object to provide an ozone generator comprising a discharge tube having a conductive film which has good ozone and nitric acid resistances and which is not easily peeled.

In order to achieve the above object, experiments were conducted and it was found that peeling of a stainless steel film of a discharge tube can be prevented by setting the thickness of the stainless steel film to be 2,000 Å to 5,000 Å.

According to the present invention, therefore, on the basis of this experimental result, in an ozone generator in which a stainless steel film is formed on the inner surface of a dielectric tube, and a high-frequency voltage is applied to the stainless steel film to perform silent discharge, thereby generating ozone, the thickness of the stainless steel film is set to be 2,000 to 5,000 Å.

In addition, an ozone generating method according to the present invention comprises:

the step of coating a metal film on a dielectric tube to have a thickness of 2,000 Å to 5,000 Å thereby tube a discharge tube;

the step of flowing a feed gas containing oxygen around the discharge tube;

the step of generating electric power having a frequency higher than a frequency of commercial power; and the step of supplying the power obtained by the generating step to the discharge tube to generate silent discharge, thereby generating ozone.

With the above arrangement, an ozone generator comprising a discharge tube having a stainless steel film which is, both electrically and thermally, not easily peeled and an ozone generating method are provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

DETAILED DESCRIPTION OF THE PREFERRED EMBODIMENTS

The present inventor examined a relationship between an operating state of an ozone generator and peeling of a stainless steel film of a discharge electrode. As a result of examination, in a normal operation (a frequency of electric power supplied to a discharge tube is equal to a frequency of commercial power) of an ozone generator, it is confirmed that almost no peeling of the stainless steel film occurs. If, however, the frequency of the electric power supplied to the discharge tube is set higher than a frequency of commercial power (generally, 500 to 2,000 Hz) in order to increase discharge power to increase an ozone generation amount per discharge tube, it is confirmed that peeling frequently occurs at a portion at which the film is thin and at a contact portion between the stainless steel film and a conductive contactor (contact or contact maker). In addition, when the electrical discharge caused by the high-frequency power lasts long, it is confirmed that film peeling occurs on the entire surface of the discharge tube.

According to the above examination results, it is assumed that when high power is supplied to the conductive film, sparks are generated at the portion at which the conductive film is thin and at the contact portion between the film and the conductive contactor since resistances are high at these portions, thereby causing film peeling. In addition, when the ozone generator is repeatedly stopped and started, the temperature of the discharge tube changes from normal temperature during operation stop to a higher temperature during discharge. Therefore, it is assumed that even a sputtered film having high adhesion strength is peeled due to a difference between thermal expansion coefficients of glass and a metal after a long-time operation.

On the basis of the above assumptions, the following two experiments were carried out in order to examine a relationship between the thickness and stability of the stainless steel film.

EXPERIMENT 1

A relationship between the thickness of a stainless steel film formed by sputtering and the stability of the stainless steel film obtained when an ozone generator is operated for a long time period was examined by an experiment.

For this experiment, ten samples were prepared for each of six different thicknesses from 500 Å to 8,000 Å of a film formed on the inner surface of a glass tube. By using these 60 samples, ozone was generated by a continuous operation for one month, maintaining the frequency of the power supplied to the discharge tube and the discharge density at the values of 1 kHz and 2 $kW/m^2$ respectively. The results were as follows.

Figure 1:
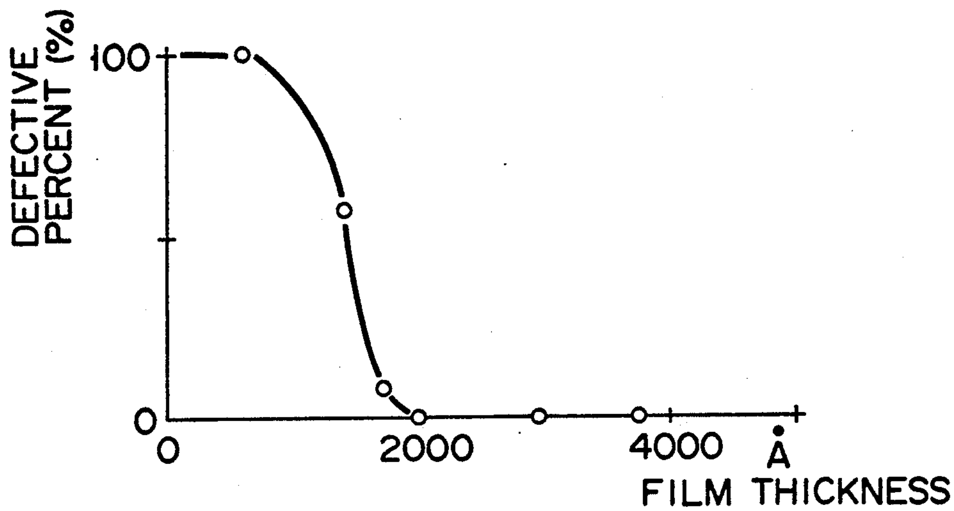
FIG. 1 is a graph showing a percent defective obtained when the thickness of a conductive film formed on the inner surface of a discharge tube is changed to carry out a continuous operation test.

In the case of the samples having 500A-thick film film peeling occurred in all ten samples. In the case of the samples having 1,400A-thick film, film peeling occured in six of the ten samples. In the case of samples having 1,800A-thick film, film peeling occurred in one of the ten samples. As for these three types of samples, the film peeling took place at the contact between the film and the conductive contactor. In the case of samples having 2,000-, 3,000-, and 3,800- Å thick films, no film peeling was caused. This result is shown in FIG. 1 in which the abscissa indicates the film thickness and the ordinate indicates the percent defective (ratio of samples which suffered from film peeling).

According to the above experimental result, it is understood that a film having a thickness of 2,000 Å armoire is required for a discharge electrode of an large-capacity ozone generator for performing discharge in which frequency of electric power supplied to the discharge tube is a high frequency of 500 Hz or more.

It is assumed that the above result is obtained because in a discharge tube having a thin film, an electrical resistance of the film is increased to generate sparks.

EXPERIMENT 2

On the basis of the above assumption, discharge tubes having different stainless steel layer thicknesses were formed to conduct a thermal shock test. Thereafter, an adhesive tape (cellophane tape) was adhered on and removed from the surface of each film to check whether the film was peeled. In order to carry out the experiment, five samples were prepared for each of five different thicknesses from 2,000 Å to 8,000 Å of a film formed on the inner surface of a glass tube. In order to conduct the thermal shock test, each sample was left to stand alternately at −60° C. and 125° C. each for 30 minutes, and this cycle was repeated five times. Thereafter, an adhesive tape was adhered on and removed from the surface of a film to check whether the film was peeled.

Figure 2:
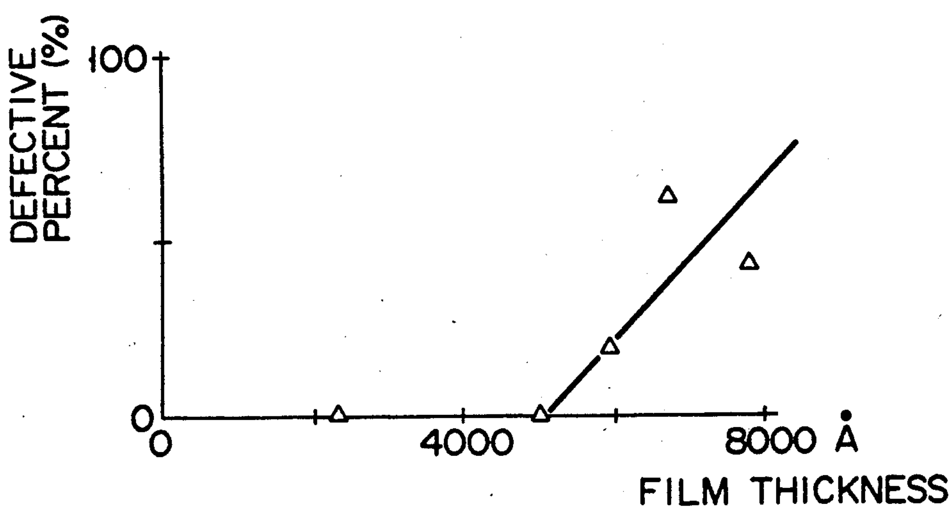
FIG. 2 is a graph showing a percent defective obtained when the thickness of a conductive film formed in the inner surface of a discharge tube is changed to carry out a thermal shock test.

As a result, in the case of samples having 2,400- and 5,000- Å thick films, no film peeling was caused in any of five samples each. In the case of samples having 6,000- Å thick films, film peeling was caused in one out of five samples. In the case of samples having 7,000- Å thick films, film peeling was caused in three out of five samples. In the case of samples having 8,000- Å thick films, peeling was caused in two out of five samples. The result is shown in FIG. 2 in which the abscissa indicates the film thickness and the ordinate indicates the percent defective.

According to the above experimental result, it is found that an ozone generator in which the thickness of a conductive film formed by sputtering falls within the range of 2,000 Å to 5,000 Å is strong against a thermal shock and can stably generate ozone for a long time period.

1st Embodiment

An arrangement of an ozone generator according to the first embodiment of the present invention constituted on the basis of the above experimental results will be described below with reference to FIG. 3.

Figure 3:
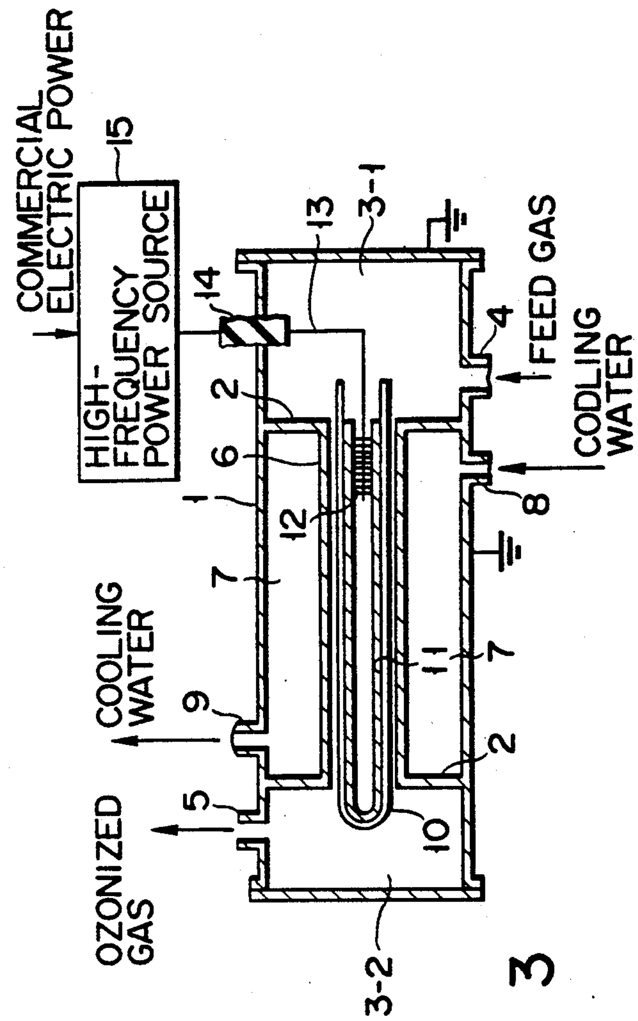
FIG. 3 is a sectional view for explaining an arrangement of an ozone generator according to the first embodiment of the present invention.

As shown in FIG. 3, two partition walls 2 having openings in a vessel 1 comprising a metal form two empty chambers 3-1 and 3-2. In one empty chamber 3-1, a feed gas inlet 4 for injecting a feed gas into the chamber 3-1 is formed. In the other empty chamber 3-2, an ozone gas outlet 5 for extracting ozone gas (or gas containing ozone) from the chamber 3-2 is formed.

A cylindrical metal tube (stainless steel tube) 6 serving as a ground electrode is connected between the openings of the two partition walls 2, thereby forming an empty chamber (cooling chamber) 7. The two empty chambers 3-1 and 3-2 are connected via the cylindrical metal tube 6. A cooling water inlet 8 is formed at a lower portion of the cooling chamber 7, and a cooling water outlet 9 is formed at its upper portion.

A cylindrical discharge tube 10 is concentrically fixed in the cylindrical metal tube 6 by a spacer (not shown). The discharge tube 10 is a cylindrical member comprising a dielectric such as glass and having two end portions. One end portion of the tube 10 is open, while the other end portion is closed. A conductive film 11 is formed on the inner surface of the discharge tube 10. A conductive contactor 12 is connected to the conductive film 11. A conductor 13 is connected to the center of the contactor 12. The contactor 13 is connected to a high-frequency power source 15 via a bushing 14 for insulation. All of the vessel 1, the partition walls 2, and the cylindrical metal tube 6 are made of conductors and are grounded. In the above arrangement, the conductive film 11 is formed by sputtering stainless steel and has a thickness of 2,000 to 5,000 Å.

As disclosed in Published Examined Japanese Patent Application No. 55-38030, the conductive film 11 is formed as described below. That is, a rod-like stainless steel electrode is inserted as a target in a glass tube. The glass tube and the electrode are located in a grounded frame. Argon gas is sealed in the frame as an atmosphere gas. A voltage is applied to the stainless steel electrode. As a result, atoms forming the stainless steel electrode are scattered to form a stainless steel film on the inner surface of the glass tube.

An operation of the ozone generator will be described below.

The high-frequency power source 15 transforms commercial electric power having a frequency of 50 or 60 Hz or a direct current power into high-frequency electric power and supplies it to the conductive film 11. This high-frequency electric power causes silent discharge between the discharge tube 10 and the ground electrode (cylindrical metal tube) 6.

A gas such as air containing oxygen is injected from the inlet 4 into the empty chamber 3-1 to pass between the cylindrical electrode 6 and the discharge tube 10. Oxygen molecules contained in the gas flowing between the electrode 6 and the discharge tube 10 are excited by the discharge to produce ozone gas. The gas containing the produced ozone is exhausted outside the generator from the empty chamber 3-2.

This ozone generator is cooled by cooling water injected from the inlet 8 to fill the chamber 7 and is discharged from the outlet 9.

According to the ozone generator of the first embodiment, since the power source 15 supplies high-frequency electric power to the discharge tube 10, an ozone generation amount per unit volume of the ozone generator is increased. In addition, since the cylindrical electrode 6 and the conductive film 11 comprising stainless steel, very high resistances are obtained against produced ozone, and $NO_x$ and nitric acid produced in addition to ozone. Furthermore, the conductive film 11 has a thickness of 2,000 Å to 5,000 Å. Therefore, even if the ozone generator is intermittently operated to repeat heating and cooling of the discharge tube and high-frequency electric power is supplied from the power source 15, the film 11 is not peeled and the life of the discharge tube is long. Therefore, the ozone generator according to the first embodiment can stably generate a large amount of ozone for a long time period with less maintenance labors.

2nd Embodiment

Figure 4:
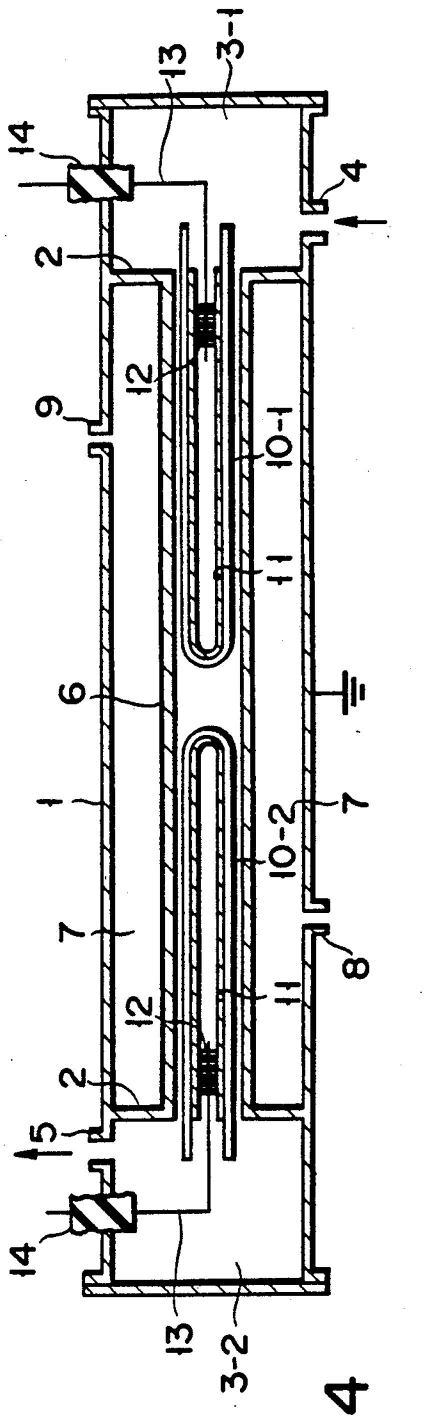
FIGS. 4 and 5 are sectional views for explaining arrangements of ozone generators according to the second and third embodiments of the present invention.

An arrangement of an ozone generator according to the second embodiment of the present invention will be described below with reference to FIG. 4. Note that in FIG. 4, the same reference numerals as in FIG. 3 denote the same parts, and a detailed description thereof will be omitted.

In this embodiment, two discharge tubes 10-1 and 10-2 are arranged in a cylindrical electrode 6. With this arrangement, ozone can be efficiently generated by discharge with the two discharge tubes. In the arrangement shown in FIG. 4, since the discharge tube 10-2 at the downstream side of a gas flow is exposed to a high-concentration ozone gas and a small amount of nitrogen oxide even during continuous operation, degradation in conductive film, local discharge, and breakdown of the discharge tube tend to occur. According to this embodiment, however, since the conductive film comprises a stainless steel film and has a thickness of 2,000 to 5,000 Å, ozone can be stably generated.

3rd Embodiment

Figure 5:
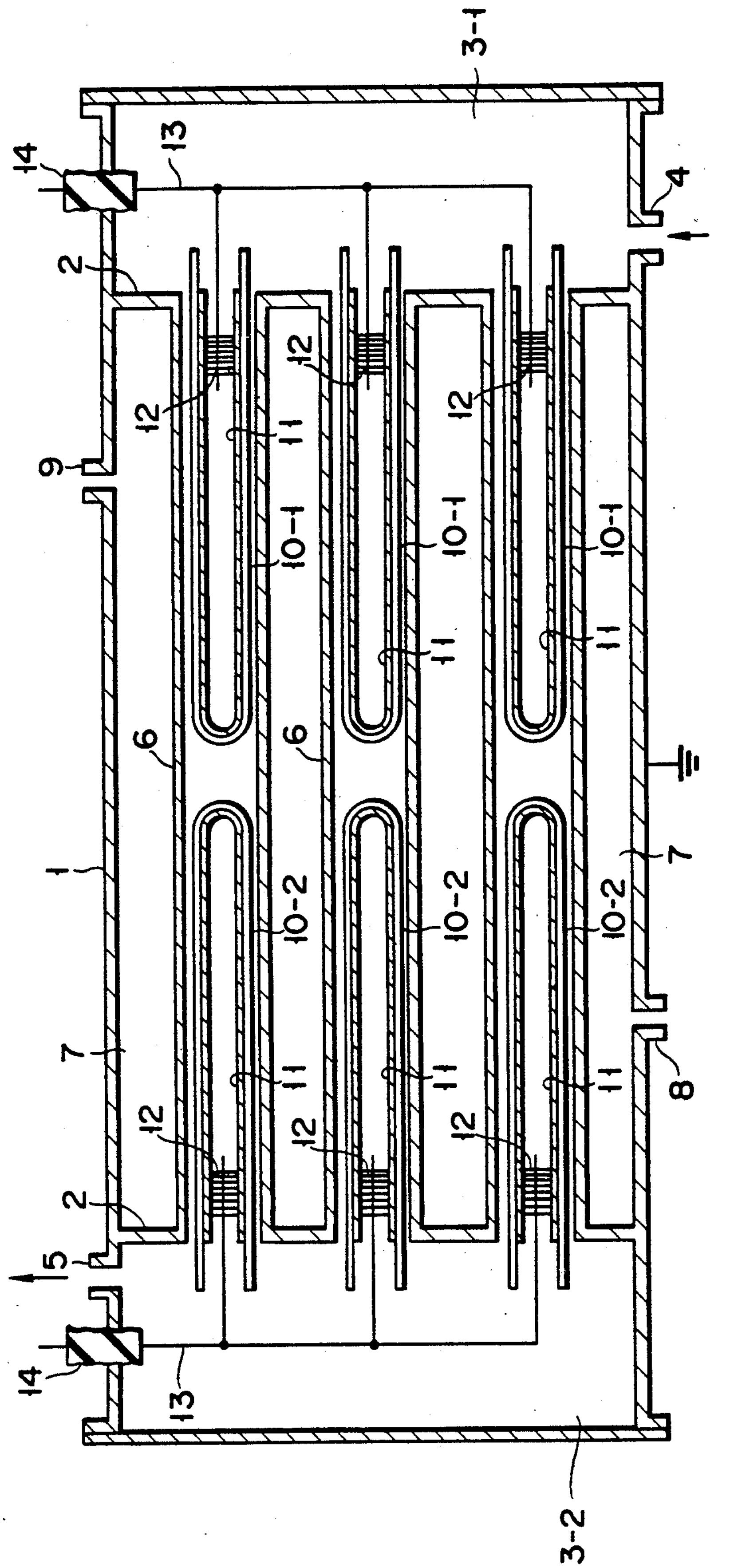

In order to increase an ozone generation amount, a number of cylindrical electrodes 6 may be mounted on partition walls 2 shown in FIG. 1 to increase the number of discharge tubes 10. An ozone generator having such an arrangement is shown in FIG. 5. Note that in FIG. 5, the same reference numerals as in 3 denote the same parts, and a detailed description thereof will be omitted. Also in this arrangement, since a stainless steel film has a thickness of 2,000 to 5,000 Å, ozone can be stably generated.

The cylindrical electrode 6 need not consist of stainless steel but may have an arrangement in which a stainless steel film or the like is formed on the inner surface of a glass tube.

The material of the metal film of the discharge tube may be those having an ozone resistance and a nitric acid resistance in addition to stainless steel, for example, inconel, hastelloy, alloy of hastelloy, gold and platinum. In addition, the material of the discharge tube need not be glass (e.g., borosilicated glass and flint glass) but may be another dielectric such as ceramics and enamel.

Even if the frequency of power supplied to the discharge tube is a frequency of commercial power, the ozone generators according to the above embodiments can stably operate for a long time period.

The present invention is not limited to the above embodiments but can be variously modified and applied without departing from the spirit and scope of the present invention.

Additional advantages and modifications will readily occur to those skilled in the art. Therefore, the invention in its broader aspects is not limited to the specific details, representative devices and methods, and illustrated examples shown and described. Accordingly, departures may be made from such details without departing from the spirit or scope of the general inventive concept as defined by the appended claims and their equivalents.

What is claimed is:

1. An ozone generator comprising:
- a feed gas chamber for receiving a feed gas;
- an ozone gas chamber for receiving a produced ozone gas;
- a tubular electrode for connecting said two chambers;
- a discharge tube constituted by a glass tube and a metal film coated on an inner surface of said glass tube and inserted in said tubular electrode; and
- power source means for applying a voltage having a frequency higher than 60 Hz between said metal film and said tubular electrode to generate discharge,
- said metal film comprising a stainless steel film having a thickness of 2,000 Å to 5,000 Å.

2. A generator according to claim 1, wherein said power source means supplies a voltage having a frequency greater than 499 Hz to said metal film.

3. An ozone generator, for generating ozone by discharge, which comprises a discharge tube including a metal coating film on a surface of a dielectric substrate, wherein said coating film has a thickness of 2,000 Å to 5,000 Å.

4. A generator according to claim 3, wherein said coating film comprises at least one of stainless steel, inconel, hastelloy, gold, platinum and an alloy of at least two of stainless steel, inconel, hastelloy, gold and platinum.

5. A generator according to claim 3, wherein said dielectric substrate comprises a tube of one of glass, ceramics and enamel, and said coating film is formed on the inner surface of said tube.

6. A generator according to claim 3, wherein said dielectric substrate comprises one of glass, ceramics and enamel.

7. A generator according to claim 3, wherein said dielectric substrate is constituted by a tube having a closed end and an open end.

8. A generator according to claim 3, further comprising power source means for receiving electric power, transforming the received electric power into electric power having a frequency higher than 60 Hz, and supplying the transformed electric power to said discharge tube, thereby generating silent discharge.

9. A generator according to claim 8, wherein said power source means supplies electric power having a frequency greater than 499 Hz to said metal coating film.

10. A generator according to claim 6, further comprising another discharge tube, wherein said discharge tubes are arranged such that one of said discharge tubes directs an opening portion toward a feed gas flow, and the other one of said discharge tubes directs a closed end portion toward the feed gas flow.

11. An ozone generating method comprising:

the step of coating a metal film on a dielectric tube to have a thickness of 2,000 Å to 5,000 Å, thereby forming a discharge tube;

the step of flowing a feed gas containing oxygen around said discharge tube;

the step of generating electric power having a frequency higher than 60 Hz; and the step of supplying the power obtained by said transforming step to said discharge tube to generate discharge, thereby generating ozone.

12. A method according to claim 11, wherein said metal film is formed on the inner surface of said dielectric tube.

13. A method according to claim 11, wherein said dielectric tube comprises one of glass, ceramics and enamel.

14. A method according to claim 11, wherein said metal film comprises a film of one of stainless steel inconel, hastelloy, gold, platinum and an alloy of at least two of stainless steel, inconel, hastelloy, gold and platinum.

15. A method according to claim 11, wherein said discharge tube forming step is constituted by the step of sputtering and adhering said metal film on said dielectric tube.

16. A method according to claim 11, wherein said generating step generates a voltage having a frequency of 500 Hz or more.

17. A method according to claim 11, wherein said generating step receives electric power having a frequency of commercial powder, transforming the received electric power into electric power having a frequency higher than 60 Hz.

18. An ozone generator comprising:

a discharge tube having an insulating substrate and a conductive film formed on said insulating substrate; and power source means for applying an electrical power to said conductive film to generate discharge, said conductive film having a thickness of 2,000 Å to 5,000 Å.

19. A generator according to claim 18, wherein said power source means supplies a voltage having a frequency greater than 499 Hz to said conductive film.

20. A generator according to claim 18, wherein said coating film comprises a metal.

21. A generator according to claim 18, wherein said insulating substrate comprises an insulating tube, and said conductive film is formed on the inner surface of said insulating tube.

22. A generator according to claim 18, wherein said insulating substrate comprises one of glass, ceramics and enamel.

23. A generator according to claim 15, wherein said insulating substrate is constituted by a tube having a closed end and an open end.

24. A generator according to claim 18, further comprising power source means for receiving electric power having a first frequency, transforming the received electric power into electric power having a second frequency higher than the first frequency, and supplying the transformed electric power to said discharge tube, thereby, generating silent discharge.

25. An ozone generating method comprising the steps of:

flowing a feed gas containing oxygen; and supplying an electrical power to a discharge member comprising an insulating member and a conductive film having a thickness of 2,000 Å to 5,000 Å formed on said insulating member, to generate discharge, thereby generating ozone.

26. A method according to claim 25, wherein said insulating member comprises one of glass, ceramics and enamel.

27. A method according to claim 25, wherein said conductive film comprises a metal.

28. A method according to claim 25, wherein said discharge member is formed by a step of sputtering and adhering a metal film on said insulating member.

29. A method according to claim 25, wherein said supplying step supplies a voltage having a frequency greater than 499 Hz.

30. A method according to claim 11, wherein said supplying step receives electric power having a first frequency, transforming the received electric power into electric power having a second frequency higher than the first frequency.

* * * * *